UNITED STATES PATENT OFFICE.

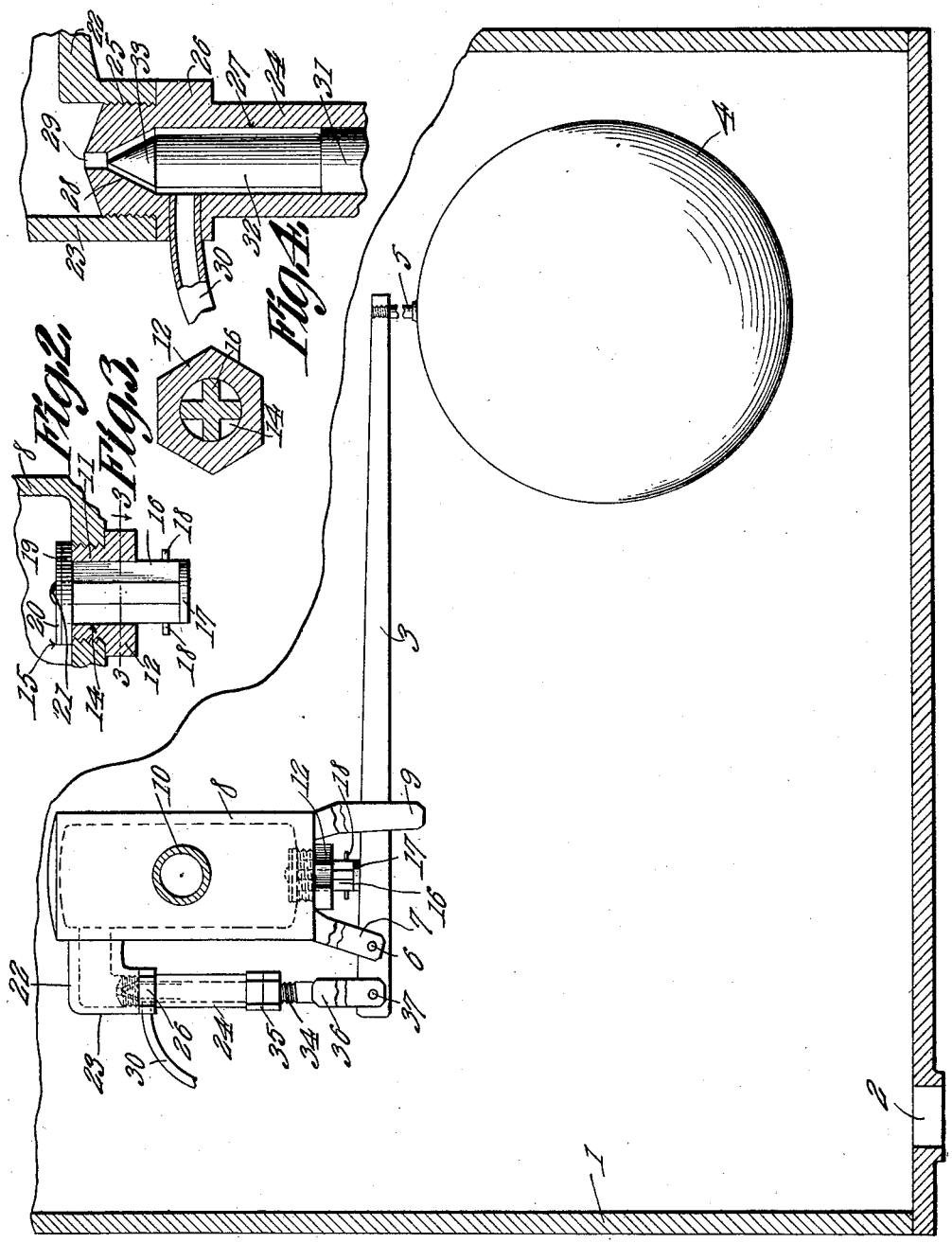

ERNEST G. WAGNER, OF LEWISTON, IDAHO.

FLUSH-TANK REGULATOR.

1,113,518.  Specification of Letters Patent.  Patented Oct. 13, 1914.

Application filed October 13, 1913. Serial No. 794,979.

*To all whom it may concern:*

Be it known that I, ERNEST G. WAGNER, a citizen of the United States, residing at Lewiston, in the county of Nez Perce and State of Idaho, have invented a new and useful Flush-Tank Regulator, of which the following is a specification.

The device forming the subject matter of this application is adapted to be employed upon flush tanks of that general type which automatically void their contents at predetermined intervals. By way of explanation it may be stated that heretofore it has been customary to regulate the continuous flow into the flush tank by means of calibrated plugs. These plugs are drilled to admit the passage of a given amount of water in a given time and under a given pressure. It is almost impossible, however, to find two flush tanks on the same level, which fact makes it impossible to use the same kind of a calibrated plug on two flush tanks and still get the same overflow. Again, some sewers require more water than others for flushing purposes, and with existing and known constructions it has been found difficult to meet these conditions. Again, regulators of the sort above mentioned, in many cases, have operated hitherto at the expense of great and unnecessary waste of water. With many of the regulators now in use, the flow through the service pipe is so slow that sediment collects in the service pipe and in the regulator proper, these parts being clogged as a result. The present invention aims to provide a device of the type above mentioned which will automatically flush the service pipe, the regulator proper and attendant parts, and still permit a fine adjustment of the regulating valve which controls the overflow, an unnecessary wasting of water being avoided.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing:—Figure 1 shows the invention in side elevation, mounted in a tank, the tank being sectioned; Fig. 2 is a fragmental vertical longitudinal section of the bottom portion of the reservoir; Fig. 3 is a horizontal transverse section on the line 3—3 of Fig. 2; Fig. 4 is a vertical longitudinal section of the reservoir, the cutting plane being passed through the regulating valve which controls the overflow.

In carrying out the invention there is shown a tank 1 provided with an outlet 2 which leads to the pipe to be flushed. The outlet 2 may be positioned as desired, and any suitable means may be provided for controlling the outlet. The specific means for controlling the outlet 2 constitutes no part of the present invention, and it may be said that this controlling means may be operated in any desired manner, the same, if deemed expedient, being operable from a lever 3, constituting a part of the present invention.

The invention contemplates the use of a float 4 of any desired form, connected by a threaded stem 5 or otherwise with the lever 3, the lever 3 being fulcrumed intermediate its ends as shown at 6, upon ears 7 forming a part of a reservoir 8, the reservoir 8 having guides 9 between which the lever 3 moves as it swings upon its fulcrum 6. The reservoir 8 is provided with a water inlet 10 adapted to be connected with a water main. The reservoir 8 is closed, saving as hereinbefore and hereinafter mentioned.

In the bottom of the reservoir 8 there is an opening, into which is threaded a bushing 11, provided with a wrench head 12 which bears against the lower face of the bottom of the reservoir 8, the bore of the bushing 11 being indicated at 14, and constituting a flushing outlet. The flushing outlet above mentioned is controlled by a valve which may be of any desired form, the valve, in the present instance, being designated generally by the reference character 15. The valve 15 comprises a body 16 which is preferably of cruciform cross section, the body 16 of the valve being slidably received within the bore 14 of the bushing 11, so that the bushing constitutes not only a flushing outlet for the reservoir 8 but, as well, constitutes a guide for the valve 15. The body 16 terminates at its lower end in a base plate 17 and stop pins 18 or like projections outstand from the body 16, these stop pins 18 being adapted to engage the wrench head 12 of the bushing 11 to limit the upward movement of the valve. Mounted upon the upper end of the body 16 of the valve is a yieldable packing disk 19 which constitutes a closure for the upper end of the bushing 11, the disk 19 being held in place by means of a washer 20 and a screw 21 or the like which enters the upper end of the body 16.

The reservoir 8 is provided with a lateral, tubular arm 22 terminated in a depending extension 23. The upper end of a casing 24 is threaded at 25 into the extension 23 and, to all intents and purposes, the casing 24 constitutes a part of the reservoir 8. Intermediate its ends, the casing 24 is provided with a wrench head 26 which abuts against the lower edge of the extension 23. The bore of the casing 24 is indicated at 27, the bore 27 being reduced adjacent its upper end as indicated at 28 to form a seat, there being a reduced inlet opening 29 in the top of the casing 24. A discharge or overflow pipe 30 enters the wrench head 26 of the casing 24 and communicates with the bore 27 of the casing, as will be understood most clearly from Fig. 4.

Mounted to reciprocate in the bore 27 of the casing 24 is a needle valve 31 provided adjacent its upper end with a reduced neck 32, the neck 32 terminating in a tapered end 33, coöperating with the seat 28 in the casing 24. Adjacent its lower end, the needle valve 31 is threaded as indicated at 34 to receive superposed nuts 35. At its lower end, the needle valve 31 terminates in arms 36 between which one end of the lever 3 is received, the lever 3 being pivotally connected with the arms 36 by means of a pin or like element 37.

The upper nut 35 on the needle valve 31 abuts against the lower end of the casing 24, the lower nut 35 constituting a lock nut for the upper nut. By the operation above described, the tapered end 33 of the needle valve 31 may be retracted from the seat 28, slightly, as shown in Fig. 4, so that there will be a continuous flow through the water inlet 10, the reservoir 8, the arm 22, the extensions 23, the inlet 29, the seat 28, the bore 27 and the discharge pipe 30. Obviously, this flow may be regulated exactly and to a nicety, by adjusting the nuts 35.

After the necessary amount of water has accumulated in the tank 1, the float 4 will be elevated, tilting the lever 3 upon its fulcrum 6. When the lever 3 is tilted in the manner hereinbefore described, the upper edge of the lever 3 engages the head 17 on the lower end of the valve 15 and unseats the valve, the flushing outlet, represented by the bore 14 of the bushing 11 being opened. By the same operation of the lever 3, the needle valve 31 will be moved downwardly. Thus, during the time that the tank 1 is being flushed, there will be a strong and continuous flow of water through the flushing outlet 14 of the reservoir 8 and through the pipe 30, it being observed that the internal diameters of the arm 22 and of the bushing 11 are substantially the same as the internal diameter of the water inlet 10. In this manner, the structure will be thoroughly flushed out in the vicinity of the upper end of the needle valve 31, and a strong current will be established through the water inlet 10 and through the reservoir 8, by way of the flushing outlet 14. Thus, a collection of sediment will be avoided and the entire structure will be thoroughly washed out at each operation.

When the water in the tank subsides, the parts will be returned to the positions shown in Figs. 1 and 4, whereupon the operation above mentioned will be repeated after an interval, the length of which will be determined by the amount of the overflow through the pipe 30 as regulated, in turn, by the position of the tapered end 33 of the needle valve 31 with respect to the seat 28 at the upper end of the casing 24.

The device herein disclosed, although of few parts and simple construction will be found thoroughly efficient to accomplish three ends: first, to regulate the overflow through the pipe 30, thereby preventing a waste of water; second to effect a flushing adjacent the upper end of the needle valve 31, thereby avoiding a collection of sediment; and third to flush the reservoir 8 and the water inlet 10, through the bore 14 of the bushing 11.

Having thus described the invention, what is claimed is:—

1. In a flush tank regulator, a reservoir provided with a continuously open regulating outlet discharging outside of the reservoir, having an inlet and a separate flushing outlet; a valve normally closing the flushing outlet thereby to establish a continuous flow from the inlet through the reservoir and out of the regulating outlet; a valve movable with respect to the regulating outlet to increase the flow therethrough; and a single float controlled means operatively connected with both valves to move the same toward open positions at once.

2. In a flush tank regulator, a reservoir provided with a continuously open regulating outlet discharging outside of the reservoir, the reservoir having an inlet and a separate flushing outlet; a valve normally closing the flushing outlet thereby to establish a continuous flow from the inlet through the reservoir and out of the regulating outlet; a valve movable with respect to the regulating outlet to increase the flow therethrough; a single float controlled means operatively connected with the valves to move the same toward open positions; and mechanism for adjusting the valve of the regulating outlet with respect to the float controlled means, thereby to vary the continuous flow through the regulating outlet.

3. In a flush tank regulator, a reservoir having a regulating outlet and provided with a flushing outlet; a needle valve controlling the regulating outlet; a valve controlling the flushing outlet; a float operated lever pivotally connected with the needle valve; and a fulcrum for the lever, the lever constituting means for operating the valve of the flushing outlet.

4. In a flush tank regulator, a reservoir having a regulating outlet and provided with a flushing outlet; a needle valve slidable in the reservoir and controlling the regulating outlet; a nut threaded upon the needle valve and adapted to engage the reservoir to adjust the needle valve with respect to the regulating outlet; a float controlled lever to which the needle valve is pivoted; a fulcrum for the lever; and a valve slidable in the flushing outlet and controlling the same, the last specified valve lying in the path of the lever, whereby both valves may be opened upon a single movement of the lever.

In testimony that I claim the foregoing as my own, I have hereto affixed my signature in the presence of two witnesses.

ERNEST G. WAGNER.

Witnesses:
R. S. BONNELL,
D. C. URIGHTER.

---

Copies of this patent may be obtained for five cents each, by addressing the "Commissioner of Patents, Washington, D. C."